April 23, 1968        R. B. COLE        3,379,283
BIDIRECTIONAL ROTARY SPRING RETURN MECHANISM
Filed Aug. 18, 1967
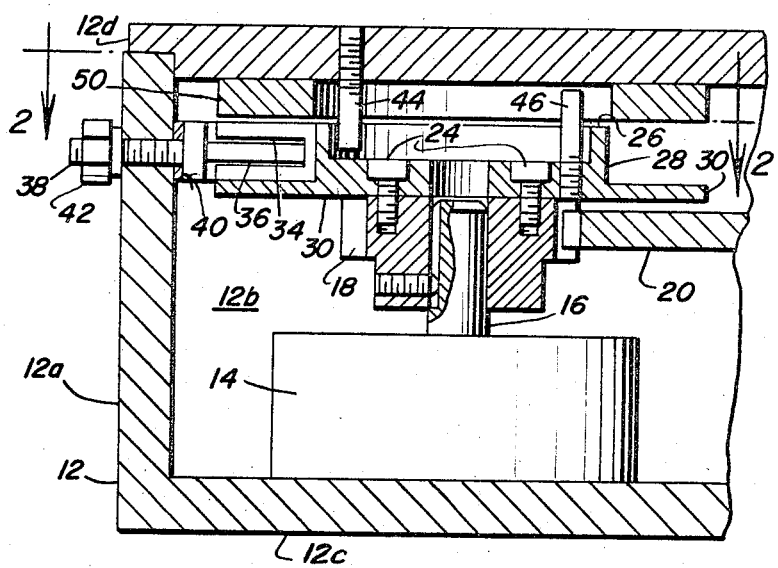
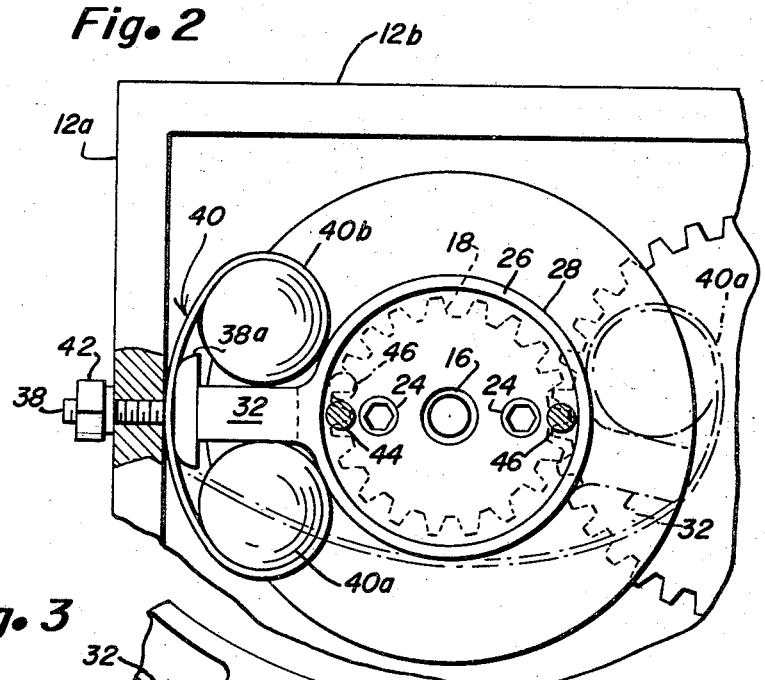
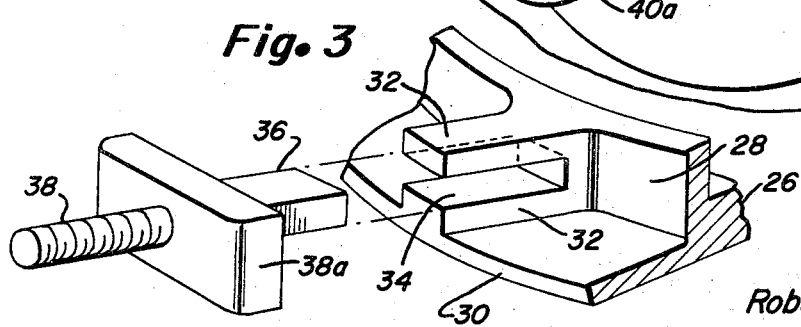
INVENTOR.
Robert B. Cole
BY
ATTORNEYS

United States Patent Office 3,379,283
Patented Apr. 23, 1968

---

3,379,283
BIDIRECTIONAL ROTARY SPRING RETURN MECHANISM
Robert B. Cole, Covina, Calif., assignor, by mesne assignments, to the United States of America
Filed Aug. 18, 1967, Ser. No. 661,733
7 Claims. (Cl. 185—37)

ABSTRACT OF THE DISCLOSURE

A spring mechanism for returning a rotary potentiometer shaft to its center position of rotation after being decoupled from a drive shaft as by a magnetic clutch. The mechanism comprises a single negator spring coiled into two equal sized coils with the coils set on opposite sides of a fixed mechanical stop. The potentiometer shaft carries a radial arm which in the centered position is aligned with the stop. Movement of the arm to one side or the other of the stop uncoils the corresponding coil which exerts a restoring force on the arm.

Background of the invention

Circuits utilizing rotary shaft control devices, such as potentiometers, wherein it is desired that the control shaft be returned to a centered position when released from the rotating force, have required various spring means, servo means, or the like for this purpose. The existing spring return devices have had the disadvantages of changing resistance to rotation of the shaft through its range of rotation, while the servo type return devices, although notably more accurate, are characterized by greater expense and increased maintenance.

Summary of the invention

With the foregoing in mind, it is a principal object of this invention to provide an improved, bidirectional rotary shaft return spring mechanism for returning a control shaft of a potentiometer or other control device to its center of rotation position after being released from the rotating force as by disengagement of a magnetic clutch or the like.

As another object, this invention aims to provide an improved control shaft return spring mechanism which exhibits a substantially constant returning force throughout the range of rotation of the shaft to either side of its rotationally centered position.

Yet another object is the provision of an improved control shaft return spring mechanism of the foregoing character, comprising a single negator spring coiled into two equal coils with the coils disposed on opposite sides of a fixed mechanical stop, a drum attached to the control shaft for rotation therewith and having radial finger means which, in the shaft centered position, are in alignment with the stop and which acts to uncoil one or the other of the coils when the shaft is rotated to move the fingers to one side or the other of the stop, whereby the coil being acted on reacts to evert a centering force through the fingers to the shaft.

Brief description of the drawings

The invention may be further said to reside in certain constructions and arrangements of parts by which the foregoing objects and advantages are achieved, as well as others which will become apparent from the following description of the preferred embodiment when read in conjunction with the accompanying sheet of drawings forming a part of this specification, and in which:

FIG. 1 is a vertical sectional view of a bidirectional rotary shaft return spring mechanism embodying the present invention and shown in association with the control shaft of a potentiometer;

FIG. 2 is a sectional view taken substantially along line 2—2 of FIG. 1; and

FIG. 3 is an enlarged, fragmentary, perspective view of a portion of the device of FIG. 1.

Description of the preferred embodiment

In the form of the invention illustrated in the drawings and described hereinafter, there is provided a bidirectional rotary shaft return spring mechanism forming part of an assembly 10 comprising a frame or housing 12 having an end wall 12a, side wall 12b, a bottom wall 12c, and a top wall or cover 12d. The assembly includes a potentiometer 14 mounted on the bottom wall 12c and having a rotary shaft 16 on which is secured a spur gear 18, the teeth of which are shown in meshing engagement with the teeth of another gear 20. The gears 18 and 20 form part of a gear train for positioning the shaft 16 of the potentiometer 14 in accordance with some event such as, for example, azimuthal movement of a gun turret, so that positions of rotation of the control shaft 16 result in meaningful electrical signals for apparatus served by the assembly 10 but forming no part of this invention. Suffice it to say that the gears 18, 20 provide force for rotationally positioning the control shaft 16 in one direction or the other from a centered position described hereinafter, and that thereafter the gears are allowed to turn freely, as by disengagement of gear teeth or of a clutch or the like, whereupon the control shaft 16 will be returned to its centered position by the spring mechanism about to be described.

Mounted on the gear 18, as by screws 24, is a drum member 26 having a cylindrical drum surface 28 which is coaxial with the shaft 16. Extending from the lower edge of the drum surface 28 of the member 26 is a flange 30. A pair of axially spaced fingers 32 extend radially from the drum surface 28, one of the fingers being conveniently formed integrally with the flange 30 as is best shown in FIG. 3. A slot 34 is defined between the fingers 32 and is adapted to receive an interdigitating fixed stop member 36 which extends inwardly from the head 38a of a "Negator" spring anchor bolt 38. The threaded portion of hte latter extends through an aperture at the mid-point of a "Negator" spring 40 and through an opening in the wall 12a.

A nut 42 is tightened on the bolt 38 and causes the head 38a to tightly clamp the mid-portion of the "Negator" spring 40 against the wall 12a. The end portions of the spring 40 are coiled into two equal coils 40a and 40b on opposite sides of the stop member 36 and of the fingers 32 when the latter are aligned with the stop member. When so positioned, the control shaft 16 is in its centered position and is held there by the coils 40a, 40b until a sufficient rotary force is applied through the gears 18, 20 to overcome the tendency of one or the other of the coils to move toward the stop member.

When such a rotary force is applied by the gears, for example causing counter-clockwise rotation of the shaft 16 as viewed in FIG. 2, the coil 40a is displaced from its full line position toward the dotted line position.

Rotation of the shaft 16 is limited to about 175° in either direction from the centered position by a pin 44 extending downwardly from the cover 12d and cooperable with a pin 46 extending upwardly from the drum member 26.

The coiled end portions 40a, 40b of the spring 40 are loosely confined between the flange 30 of the drum member 26 and an annular bearing plate 50 which is suitably fixed to the inner surface of the cover wall 12d.

When moving toward the dotted line position, the coil 40a unwraps or uncoils while continuously exhibiting a substantially constant resilient opposition to such uncoiling, thereby providing a substantially constant restoring force on the fingers 32 tending to return the shaft 16 to the centered position. Accordingly, removal or decrease of the rotational force on the shaft 16 will result in clockwise rotation of the shaft under the influence of the "Negator" spring 40 which coils itself toward the full line position.

During uncoiling and coiling of the coils 40a or 40b, some sliding takes place between the spring material and each of the drum surface 28, the ends of finger 32, and the side surfaces of the fingers. In order to minimize friction at these places, the strip of spring metal from which the "Negator" spring 40 is formed, may be conveniently coated with a friction reducing material such as polytetrafluoroethylene, sometimes known as Teflon.

From the foregoing detailed description, it will be appreciated that the bidirectional spring return mechanism of this invention has achieved the aforementioned objects and advantages, as well as others apparent from this description.

Obviously many modifications and variations of the present invention are possible in the light of the above teachings. It is therefore to be understood that within the scope of the appended claims, the invention may be practiced otherwise than as specifically described.

What is claimed is:

1. In an assembly including a device having a rotary control shaft, a bidirectional spring return mechanism comprising:
    frame means supporting said device;
    a drum member fixed on said shaft for rotation therewith, said drum member having an external cylindrical surface coaxial with said shaft;
    finger means extending radially from said cylindrical surface;
    a "Negator" spring having its mid portion fixed to said frame means and having its opposite end portions formed into substantially equal first and second coils, each having a tendency to coil itself toward said mid portion;
    stop means fixed to said frame means and disposed between said coils to limit coiling thereof toward one another;
    said finger means being disposed between said coils and in alignment with said stop means when said shaft is in a predetermined rotationally centered position, said finger means being operative to displace and partially uncoil one of said coils upon rotation of shaft in one direction from said centered position and to displace and partially uncoil the other of said coils upon rotation in the opposite direction from said centered position; and
    said coils being operative to return said shaft to said centered position upon release of said shaft from other rotational forces.

2. A bidirectional spring return mechanism as defined in claim 1 and further comprising:
    cooperating stop means on said frame means and on said drum member for limiting rotation thereof and of said shaft in either direction from said centered position.

3. A bidirectional spring return mechanism as defined in claim 2 and wherein:
    said finger means comprises first and second, spaced, radially extending fingers defining a gap therebetween in which said stop member is interdigitated with said fingers when said shaft is in said centered position.

4. A bidirectional spring return mechanism as defined in claim 2 and further comprising:
    a peripheral flange extending outwardly from one edge of said cylindrical surface of said drum member;
    an annular bearing plate fixed to said frame means and congruent with said flange; and
    said "Negator" spring coils being loosely confined between said flange and said bearing plate.

5. A bidirectional spring return mechanism as defined in claim 3 and further comprising:
    a peripheral flange extending outwardly from one edge of said cylindrical surface of said drum member;
    an annular bearing plate fixed to said frame means and congruent with said flange; and
    said "Negator" spring coils being loosely confined between said flange and said bearing plate.

6. A bidirectional spring return mechanism as defined in claim 5 and wherein:
    said "Negator" spring has its mid-portion fixed to said frame means by an anchor bolt having a head in clamping relation to said spring mid-portion, and having a threaded portion secured in said frame means; and
    said fixed stop member extending from said head and between said coils.

7. A bidirectionad spring return mechanism as defined in claim 5 and further comprising:
    a coating of friction reducing plastic material on said "Negator" spring.

References Cited

UNITED STATES PATENTS

| | | | |
|---|---|---|---|
| 2,553,248 | 5/1951 | Graham | 267—1 |
| 2,656,178 | 10/1953 | Hughes | 267—1 |
| 2,670,198 | 2/1954 | Glaser et al. | 267—1 |
| 2,756,610 | 7/1956 | Hibbard | 267—1 |
| 2,811,201 | 10/1957 | Reid | 267—1 |
| 2,899,193 | 8/1959 | Foster | 267—1 |
| 3,117,771 | 1/1964 | Herr et al. | 267—1 |
| 3,155,855 | 11/1964 | Futterer | 267—1 |

EDGAR W. GEOGHEGAN, *Primary Examiner.*